United States Patent
Toledo et al.

(10) Patent No.: US 8,378,850 B2
(45) Date of Patent: Feb. 19, 2013

(54) VEHICLE PARK ASSIST SYSTEM AND METHOD FOR PARKING A VEHICLE USING SUCH SYSTEM

(75) Inventors: Salvador Toledo, Ypsilanti, MI (US); Dirk Gunia, Pulheim (DE); Janet Meise, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 12/557,604

(22) Filed: Sep. 11, 2009

(65) Prior Publication Data

US 2011/0063131 A1    Mar. 17, 2011

(51) Int. Cl.
*B60Q 1/48* (2006.01)
(52) U.S. Cl. ............. 340/932.2; 340/903; 340/435; 340/436
(58) Field of Classification Search ........ 340/932.2, 340/903, 435, 436, 425.5; 701/1, 36, 41, 701/45, 300, 301; 348/143, 148
See application file for complete search history.

(56) References Cited

U.S. PATENT DOCUMENTS

| | | | |
|---|---|---|---|
| 4,931,930 A * | 6/1990 | Shyu et al. ............... 701/36 |
| 6,170,591 B1 * | 1/2001 | Sakai et al. ............... 180/204 |
| 6,919,822 B2 | 7/2005 | Tanaka et al. |
| 6,919,917 B1 | 7/2005 | Janssen |
| 6,948,729 B2 | 9/2005 | Zalila et al. |
| 7,117,073 B2 | 10/2006 | Endo et al. |
| 7,344,205 B2 * | 3/2008 | Kamiya et al. ............... 303/124 |
| 7,498,954 B2 * | 3/2009 | Boss et al. ............... 340/932.2 |
| 7,526,368 B2 | 4/2009 | Endo et al. |
| 7,599,773 B2 * | 10/2009 | Tanaka et al. ............... 701/36 |
| 7,640,108 B2 * | 12/2009 | Shimizu et al. ............... 701/301 |
| 8,018,351 B2 * | 9/2011 | Hering et al. ............... 340/932.2 |
| 8,144,031 B2 * | 3/2012 | Kawabata et al. ............... 340/908 |
| 2008/0033647 A1 | 2/2008 | Milark et al. |

* cited by examiner

*Primary Examiner* — Hung T. Nguyen
(74) *Attorney, Agent, or Firm* — Frank MacKenzie; MacMillian, Sobanski & Todd LLC

(57) ABSTRACT

A park assist system for parking a vehicle in a target parking space includes a first sensing system which determines whether there is a sufficient slot length in a target parking space in which to park the vehicle. A second sensing system determines whether an obstacle is located in a predetermined clearance zone on a side of the vehicle opposite the target parking space. A decision regarding whether to recommend parking the vehicle in the target parking space sensed by the first sensing system is dependent upon a determination that an obstacle located in the clearance zone may be avoided by executing a first steering trajectory provided by the park assist system in order to avoid the obstacle before executing a second steering trajectory provided by the park assist system in order to park the vehicle into the target parking space.

10 Claims, 2 Drawing Sheets

VEHICLE PARK ASSIST SYSTEM AND METHOD FOR PARKING A VEHICLE USING SUCH SYSTEM

BACKGROUND

This invention relates in general to vehicle park assist systems and in particular to an improved park assist system and method for parking of such a vehicle.

Vehicle park assist systems are used to identify a feasible parking space, e.g., usually a parallel space, a rear perpendicular space, or a garage parking space, and then take over the steering of the vehicle to maneuver the vehicle into the identified space hands free. During operation, the driver still shifts the transmission and operates the gas and brake pedals. Thus, while the steering is done automatically, the driver is still responsible for safe parking of the vehicle.

One known vehicle park assist system is disclosed in U.S. Pat. No. 6,948,729 to Zalila et al. In U.S. Pat. No. 6,948,729, sensors 36 sense front obstacles 4, back obstacles 16 and an edge 5 of the possible parking space 2. Sensed data is processed and an output is provided which assists the driver in parking the vehicle.

SUMMARY

The present application describes various embodiments of a park assist system. One embodiment of the park assist system for parking a vehicle in a target parking space includes a first sensing system which determines whether there is a sufficient slot length in a target parking space in which to park the vehicle. A second sensing system determines whether an obstacle is located in a predetermined clearance zone on a side of the vehicle opposite the target parking space. A decision regarding whether to recommend parking the vehicle in the target parking space sensed by the first sensing system is dependent upon a determination that an obstacle located in the clearance zone may be avoided by executing a first steering trajectory provided by the park assist system in order to avoid the obstacle before executing a second steering trajectory provided by the park assist system in order to park the vehicle into the target parking space.

According to another embodiment, a method for parking a vehicle in a target parking space includes a vehicle having a sensing system and a park assist system operatively connected thereto. Neighboring objects are scanned using a first sensor to determine if a target parking space is available for parking the vehicle. The neighboring objects include at least one object either in front of or behind the target parking space, and the first sensor provides an input signal to the park assist system. Neighboring objects on the side of the vehicle opposite the target parking space are scanned using a second sensor to determine if a first clearance zone on the side of the vehicle opposite the target parking space is free of obstacles, and the second sensor provides an input signal to the park assist system. Neighboring objects on the side of the vehicle opposite the target parking space are scanned using the second sensor to determine if a second clearance zone on the side of the vehicle opposite the target parking space is free of obstacles, and the second sensor provides an input signal to the park assist system. The park assist system is used to determine whether there is a sufficient slot length in which to park the vehicle. If no obstacles are identified in the first clearance zone but an obstacle is identified in the second clearance zone, then the park assist system is used to identify a first steering trajectory to avoid the obstacle and a second steering trajectory to park the vehicle into the target parking space. The vehicle is then parked in the target parking space along the first and second steering trajectories.

According to yet another embodiment, a method for parking a vehicle in a target parking space includes a vehicle having a sensing system and a park assist system operatively connected thereto. Neighboring objects are scanned using a first ultrasonic sensor to determine if a target parking space is available for parking the vehicle. The neighboring objects include at least one object either in front of or behind the target parking space, and the first ultrasonic sensor provides an input signal to the park assist system. Neighboring objects on the side of the vehicle opposite the target parking space are scanned using a second ultrasonic sensor to determine if a clearance zone on the side of the vehicle opposite the target parking space is free of obstacles, wherein the second ultrasonic sensor provides an input signal to the park assist system. The park assist system is used to determine whether there is a sufficient slot length in which to park the vehicle. If an obstacle is identified in the clearance zone, then the park assist system is used to identify a first steering trajectory to avoid the obstacle and a second steering trajectory to park the vehicle into the target parking space. The vehicle is then parked in the target parking space along the first and second steering trajectories.

Other advantages of the park assist system will become apparent to those skilled in the art from the following detailed description, when read in light of the accompanying drawings.

DETAILED DESCRIPTION

Figure 1:
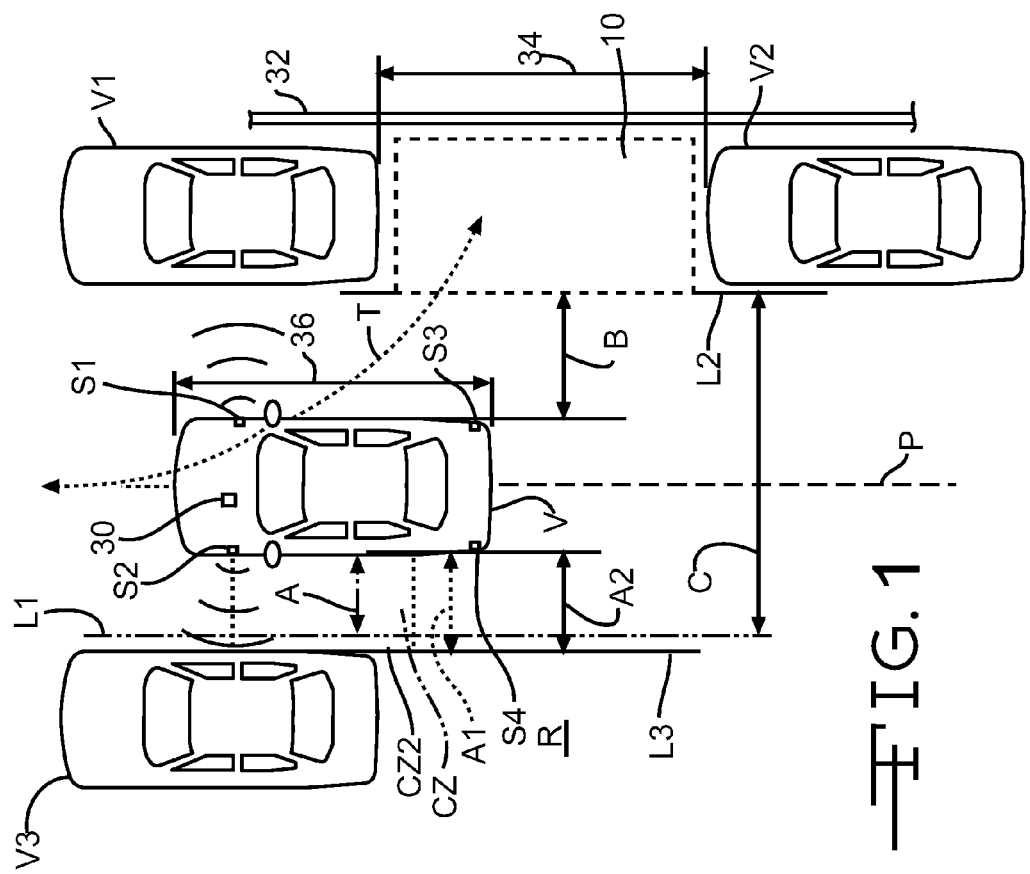
FIG. 1 is a schematic diagram of a first embodiment of a path to a target parking space and a clearance zone using a park assist system according to the present invention.
Figure 1A:
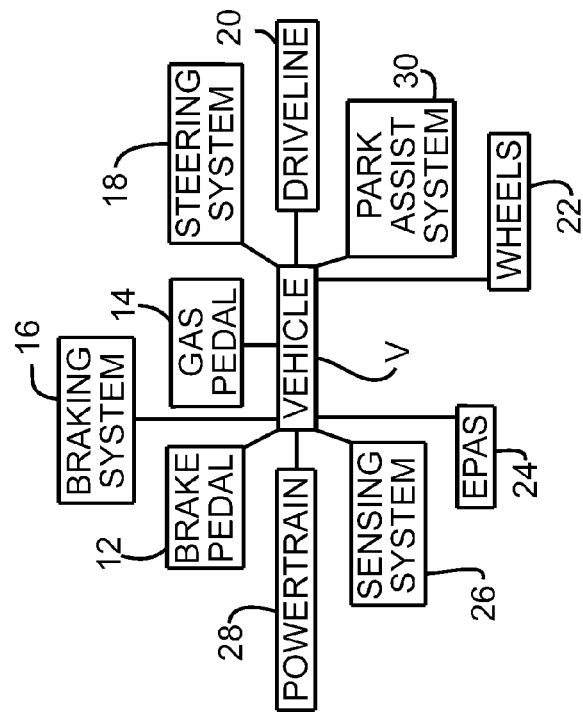
FIG. 1A is a schematic diagram of a portion of the park assist system illustrated in FIG. 1, showing the associated vehicle used therewith.

Referring now to FIG. 1, there is illustrated a schematic diagram of a first embodiment of a path P for parking of a vehicle V to a target parking space or space 10 between two parked vehicles V1 and V2, using a park assist system, which will be described in detail below, according to the present invention. In the illustrated embodiment, the vehicle V, schematically shown in FIG. 1A, includes at least the following components or systems: a brake pedal 12, a gas pedal 14, a braking system 16, a steering system 18, a driveline system 20, wheels 22, an electric power assisted steering (EPAS) system 24 which is part of the steering system 18, a sensing system 26, a powertrain system 28, and a park assist system 30. Alternatively, an electro-hydraulic power assisted steering system may be used in lieu of EPAS, and radar, lidar, lasers, or thermal sensors may be used in lieu of the ultrasonic sensors. The park assist system 30 is also shown schematically in FIG. 1. However, it must be understood that the vehicle V to be parked may include any other suitable components or systems and that only those components or systems which are necessary for describing and explaining the function and operation of the present invention are illustrated herein.

In the illustrated embodiment, the sensing system 26 is operatively connected to the park assist system 30 to provide input signal(s) thereto and preferably includes ultrasonic sensors, GPS and/or odometric sensors, and an absolute steering wheel angle sensor. Alternatively, the park assist system 30 may include a relative steering wheel angle sensor in lieu of an absolute steering wheel angle sensor. The ultrasonic sensors may be located on a side(s) of a front and/or rear bumpers of the vehicle V. In the illustrated embodiment of FIG. 1, ultrasonic sensors, indicated generally at S1 and S2 are illustrated schematically. The sensor S1 is shown as being located on a front passenger or right side bumper of the vehicle V. The sensor S2 is shown as being located on a front driver or left side bumper of the vehicle V.

Alternatively, the number and or the location of the ultrasonic sensors may be other than illustrated if so desired. For example, one or more ultrasonic sensors may be located on one or both of the rear bumpers of the vehicle (as shown as S3 and S4 in FIG. 1), or in any suitable combinations of or desired locations thereof on the vehicle V. The sensor or sensors S1 and/or S3 mounted on the passenger side of the vehicle V define a first sensing system. Similarly, the sensor or sensors S2 and/or S4 mounted on the driver side of the vehicle V define a second sensing system.

In the illustrated embodiment, the odometric sensors may be located on one or more of the wheels 22 of the vehicle V and/or in the driveline system 20 of the vehicle. The steering wheel angle sensor is located on the steering system 18 of the vehicle and preferably is located on a steering wheel of the steering system 18. Alternatively, the construction and/or the components of the sensing system 26 of the vehicle V may be other than illustrated and described if so desired.

In the illustrated embodiment, the vehicle V is parked into the target parking space 10 using the park assist system 30 of the present invention. To accomplish this, at least one of the ultrasonic sensors S1, S3 is used in conjunction with the odometric sensors and the steering wheel angle sensor to scan neighboring objects and their location relative to the position of the vehicle V as a driver of the vehicle drives by the objects. In the illustrated embodiment of FIG. 1, the neighboring objects are illustrated as being the two parked vehicles V1 and V2 and an object 32, such as for example, a curb or a wall. However, one or more of the neighboring objects may be other kinds or types than that which are illustrated and described. It will be understood that the park assist system 30 of the present invention may successfully identify a target parking space 10 relative to only one object or vehicle, such as either the vehicle V1 or the vehicle V2, is present and sensed.

The information from the sensors is processed by a computer of the park assist system 30 to determine if a valid path trajectory T can be performed to park the vehicle V into the target parking space 10. The calculation by the computer of the park assist system 30 includes a determination of a slot length 34 depending upon a length 36 of the vehicle V.

Additionally, the calculation by the computer of the park assist system 30 includes a determination of whether there is sufficient space to maneuver the vehicle V into the target parking space 10 by determining whether a neighboring object or potential obstacle is present on the side of the vehicle opposite the target parking space 10. To accomplish this, at least one of the ultrasonic sensors S2, S4 is used in conjunction with the odometric sensors and the steering wheel angle sensor to scan neighboring objects or potential obstacle(s) on the side of the vehicle V opposite the target parking space 10, and their position(s) relative to the vehicle V as a driver of the vehicle drives by the potential obstacle(s).

In the illustrated embodiment, the potential obstacle is illustrated as a vehicle V3 in the roadway R. In order for the vehicle V to successfully maneuver into the target parking space 10, a first clearance zone CZ must be free of obstacles. A line L1 is parallel to the path P and runs through the closest point that the vehicle V3 may be to the vehicle V without encroaching into the path the vehicle V must travel to successfully maneuver into the target parking space 10 without altering its trajectory T. The first clearance zone CZ is therefore defined as the space between the driver side of the vehicle V and the line L1.

As shown in FIG. 1, a first predetermined lateral distance A is defined as the minimum lateral distance between the left or driver side of the vehicle V and the line L1, and defines a width of the first clearance zone CZ.

If the computer of the park assist system 30 determines that a measured lateral distance A1 to a potential obstacle, such as the vehicle V3, as measured by the sensor S2 and/or S4 is larger than the predetermined lateral distance A, then the first clearance zone CZ will be considered free of obstacles.

If after computing the trajectory T, as shown in FIG. 1, the park assist system 30 identifies the obstacle or vehicle V3, the computer of the park assist system 30 may compare the measured lateral distance A1 to a second predetermined lateral distance A2. The second predetermined lateral distance A2 is defined as the minimum lateral distance between the left or driver side of the vehicle V and a line L3. A second clearance zone CZ2 is then defined as the space between the line L1 and the line L3.

The second clearance zone CZ2 represents a zone in which an obstacle may be located, but for which the park assist system 30 can calculate an alternative trajectory along which the vehicle (illustrated at V in FIG. 1, and at V' and V'' in FIG. 3) may successfully maneuver into the target parking space 10 while avoiding the obstacle or vehicle V3 in the second clearance zone CZ2.

Figure 3:
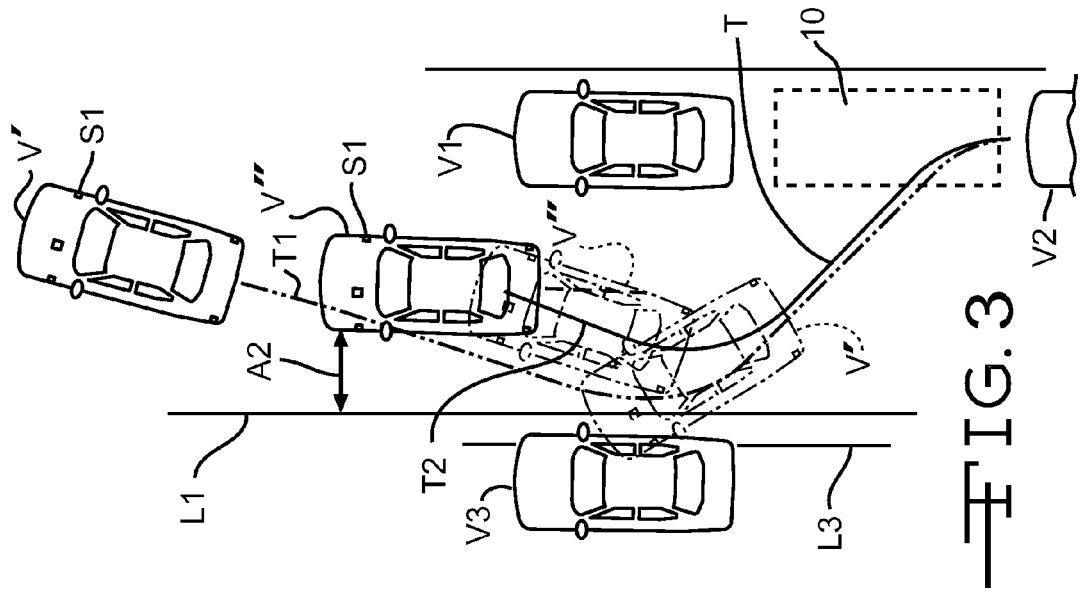
FIG. 3 is a schematic diagram of a second embodiment of a path to a target parking space and a clearance zone using a park assist system according to the present invention.

For example, referring to FIG. 3, the right side of the vehicle V3 is in the second clearance zone CZ2. A trajectory T1 to the target parking space 10 recommended by the park assist system 30 of the vehicle V' may cause the vehicle V' to contact the obstacle or vehicle V3 during rearward movement of the vehicle V'. The park assist system 30 may therefore reject and not recommend the target parking space 10 as a feasible parking space. However, when the park assist system 30 identifies an alternate first steering trajectory, shown as the trajectory T2 for the vehicle V'', such undesirable contact with the obstacle or vehicle V3 may be avoided, and the vehicle V'' may then successfully maneuver to the target parking space 10 along a second steering trajectory T.

Accordingly, the target parking space 10 can be recommended by the park assist system 30. Although the obstacle or vehicle V3 has been identified, the measured lateral distance A1 to the vehicle V3 is between the first and second predetermined lateral distances A and A2; i.e., in the second clearance zone CZ2. Additionally, the park assist system 30 is able to calculate an alternative trajectory T2 along which the vehicle V'' may successfully maneuver into the target parking space 10 while avoiding the vehicle V3.

As also shown in FIG. 1, a lateral distance B is the measured lateral distance between the right or passenger side of the vehicle V and a left-most edge, illustrated by the line L2, of the target parking space 10. A predetermined lateral distance C represents the minimum total lateral distance between the left-most edge L2 of the target parking space 10 and the right-most edge L1 of the first clearance zone CZ required to successfully maneuver the vehicle V into the target parking space 10.

Figure 2:
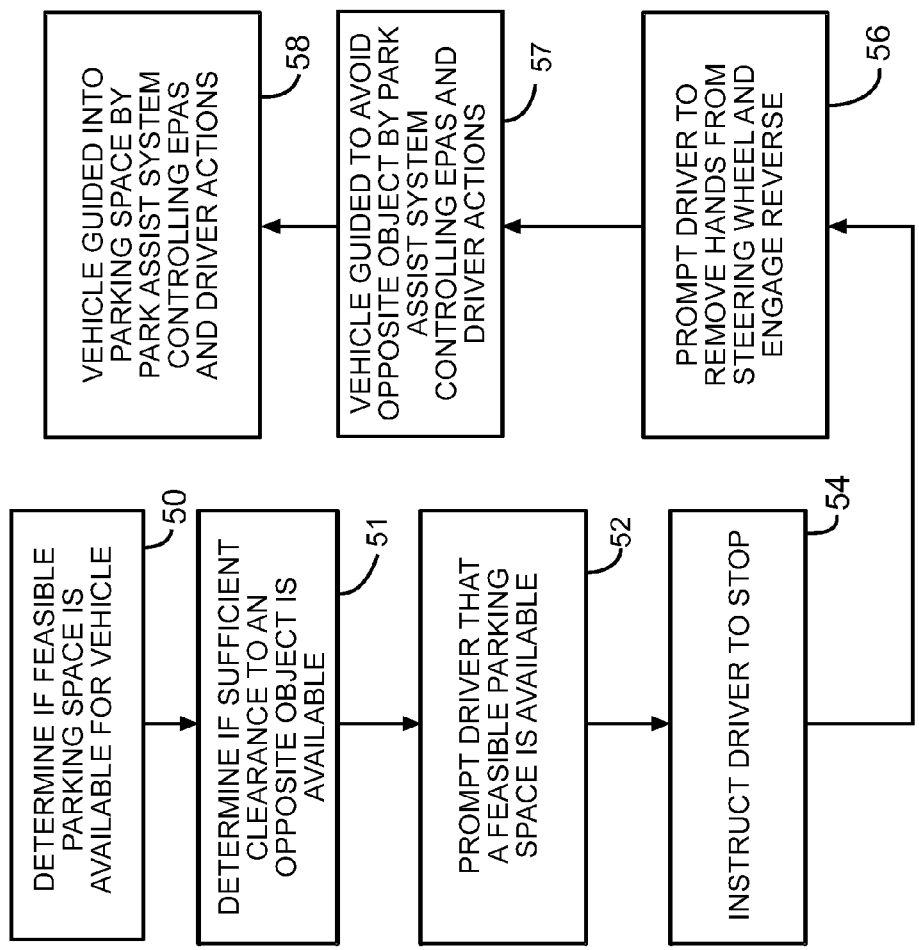
FIG. 2 is a flow chart of an embodiment of a method for parking a vehicle using the park assist system of the present invention.

Referring now to FIG. 2, there is illustrated a flow chart of an embodiment of a method for parking a vehicle using the park assist system 30 of the present invention. As shown in FIG. 2, the method of the present invention includes a first step 50 in which the park assist system 30 determines if there is a feasible target parking space 10 available for parking of the vehicle V. To accomplish this, the park assist system 30 uses the sensor S1 of the sensing system 26. As discussed above, the sensor S1 determines whether there is a sufficient slot length 34 in which to park the vehicle V.

Simultaneously, in a second step 51, the sensor S2 determines whether there is sufficient clearance to an obstacle, such as a vehicle V3, on the side of the vehicle V opposite the target parking space 10. If such an obstacle is in a predetermined first clearance zone CZ, i.e., is less than the predetermined lateral distance A from the vehicle V, the obstacle is thus considered in a position to interfere with the successful maneuver of the vehicle V into the target parking space 10.

Further in the second step 51, the sensor S2 determines whether there is an obstacle V3 in a predetermined second clearance zone CZ2, i.e., is between the predetermined lateral distance A the predetermined lateral distance A2 from the vehicle V. If the obstacle is in the second clearance zone CZ2, then the park assist system 30 may identify an alternative trajectory along which the vehicle V may successfully maneuver into the target parking space 10.

Once it is determined that a feasible target parking space 10 has been identified by the park assist system 30, that there are no obstacles in the first clearance zone CZ, and that an alternative trajectory along which the vehicle V may successfully maneuver around an obstacle V3 identified in the second clearance zone CZ2, the park assist system 30 in step 52 prompts the driver via a visual and/or audible interface that a feasible target parking space 10 is available. The park assist system 30 then recommends the parking space 10. One example of a visual interface is a text message displayed in a message center in the vehicle instrument panel. Alternatively, the visual interface may be a graphic image, icon, or other non-text representation. It will be understood that such a visual interface may be located at any other desired location in the vehicle, such as an overhead console.

Next, in step 54, the driver is instructed by the park assist system 30, either visually and/or audibly, to stop in order to accept the system assistance to park. Once the driver has stopped the park assist system 30 in step 56 will prompt the driver to remove his or her hands from a steering wheel of the steering system 18 and engage or shift the transmission of the powertrain system 28 into reverse gear. Once the driver has removed his or her hands from the steering wheel and engaged reverse gear, the park assist system 30 in step 57 will take over the steering wheel movement and control the EPAS system 24 to execute the calculated steering trajectory T2 based on the relative vehicle position to the obstacle or vehicle V3. Additionally, the park assist system 30 in step 58 will maintain control over the steering wheel movement and control the EPAS system 24 to continue to execute the calculated steering trajectory T into the target parking space 10 based on the relative vehicle position to the neighboring objects, i.e., in FIG. 1 the vehicles V1 and V2 and the object 32. The park assist system 30 will prompt the driver when to stop, drive backward to avoid the vehicle V3, and continue to drive backward and pull forward to park the vehicle V in the target parking space 10.

Although the target parking space 10 has been described as a parallel parking space between a forward first object and a rearward second object, the target parking space may alternatively be a rear perpendicular parking space, such as found in typical multi-vehicle parking lots and garages. Additionally, the target parking space 10 has been described as being on the right side of the vehicle V and the obstacle or vehicle V3 has been described as being on the left side of the vehicle V. Alternatively, the park assist system 30 may be used to identify a target parking space on the left side of the vehicle V and identify an obstacle or vehicle V3 on the right side of the vehicle V.

One advantage of the embodiments of the present invention is that the park assist system 30 and method of the operation thereof is capable of identifying and maneuvering to avoid obstacles on the side of the vehicle opposite the side of the vehicle of the target parking space. As a result of this, the park assist system 30 can either: (a) bypass or not recommend a target parking space 10 that may have sufficient slot length in which to park the vehicle, but for which an obstacle has been identified in the first clearance zone CZ, or (b) maneuver around an obstacle in the second clearance zone CZ2 if the target parking space 10 has sufficient slot length in which to park the vehicle. As a result of this, the park assist system 30 and method of operation thereof minimizes the risk of collision with an object on the side of the vehicle opposite the target parking space 10.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for parking a vehicle in a target parking space, the vehicle having a sensing system and a park assist system operatively connected thereto, the method comprising the steps of:

scanning neighboring objects using a first sensor to determine if a target parking space is available for parking the vehicle, the neighboring objects including at least one object either in front of or behind the target parking space, wherein the first sensor provides an input signal to the park assist system;

scanning neighboring objects on the side of the vehicle opposite the target parking space using a second sensor to determine if a first clearance zone on the side of the vehicle opposite the target parking space is free of obstacles, wherein the second sensor provides an input signal to the park assist system;

scanning neighboring objects on the side of the vehicle opposite the target parking space using the second sensor to determine if a second clearance zone on the side of the vehicle opposite the target parking space is free of obstacles, wherein the second sensor provides an input signal to the park assist system;

using the park assist system to determine whether there is a sufficient slot length in which to park the vehicle;

if no obstacles are identified in the first clearance zone but an obstacle is identified in the second clearance zone, then using the park assist system to identify a first steering trajectory to avoid the obstacle and a second steering trajectory to park the vehicle into the target parking space; and parking the vehicle in the target parking space along the first and second steering trajectories.

2. The method according to claim 1, wherein prior to the step of parking the vehicle in the target parking space, the park assist system recommends the parking space sensed by the first sensor to the vehicle driver.

3. The method system according to claim 1, wherein the first sensor is an ultrasonic sensor for determining whether there is the sufficient slot length in which to park the vehicle, and wherein the second sensor is an ultrasonic sensor for determining whether an obstacle is located in the first and second clearance zones on a side of the vehicle opposite the target parking space.

4. The method according to claim 1, wherein the target parking space is a parallel parking space between a forward first object and a rearward second object and adjacent an object.

5. The method according to claim 1, wherein the second sensor determines a measured lateral distance between the side of the vehicle opposite the target parking space and the identified obstacle.

6. The method according to claim 5, further including comparing the measured lateral distance to a first predetermined lateral distance between the side of the vehicle opposite the target parking space and the obstacle.

7. The method according to claim 6, wherein when the measured lateral distance between the side of the vehicle opposite the target parking space and the obstacle is less than the first predetermined lateral distance between the side of the vehicle opposite the target parking space and the obstacle, the park assist system does not recommend the parking space sensed by the first sensing system to the vehicle driver.

8. The method according to claim 7, further including comparing the measured lateral distance to a second predetermined lateral distance between the side of the vehicle opposite the target parking space and the obstacle.

9. The method according to claim 8, wherein when the measured lateral distance between the side of the vehicle opposite the target parking space and the obstacle is between the first and second predetermined lateral distances, the park assist system determines, recommends, and executes a first steering trajectory to avoid the obstacle and a second steering trajectory to park the vehicle into the target parking space.

10. A method for parking a vehicle in a target parking space, the vehicle having a sensing system and a park assist system operatively connected thereto, the method comprising the steps of:

scanning neighboring objects using a first ultrasonic sensor to determine if a target parking space is available for parking the vehicle, the neighboring objects including at least one object either in front of or behind the target parking space, wherein the first ultrasonic sensor provides an input signal to the park assist system;

scanning neighboring objects on the side of the vehicle opposite the target parking space using a second ultrasonic sensor to determine if a clearance zone on the side of the vehicle opposite the target parking space is free of obstacles, wherein the second ultrasonic sensor provides an input signal to the park assist system;

using the park assist system to determine whether there is a sufficient slot length in which to park the vehicle;

if an obstacle is identified in the clearance zone, then using the park assist system to identify a first steering trajectory to avoid the obstacle and a second steering trajectory to park the vehicle into the target parking space; and parking the vehicle in the target parking space along the first and second steering trajectories.

* * * * *